United States Patent Office 2,821,549
Patented Jan. 28, 1958

2,821,549

PRODUCTION OF NUCLEAR SULFONATED VINYL AROMATIC COMPOUNDS

Richard A. Mock, Midland, Mich., assignor to The Dow Chemical Company, Midland, Mich., a corporation of Delaware No Drawing. Application January 27, 1954
Serial No. 406,575

15 Claims. (Cl. 260—505)

This invention concerns a new and improved method for the production of nuclear sulfonated vinyl aromatic compounds, especially salts, e. g. alkali metal and alkaline earth metal salts, of vinyl aromatic sulfonic acids having the general formula:

$$H_2C=CH-Ar-SO_3H$$

wherein Ar represents an aromatic radical.

Vinyl aromatic sulfonates having the above general formula are referred to in U. S. Patent No. 2,527,300 as being copolymerizable with other vinylidene compounds, but apparently are otherwise unknown in the art. It is known that beta-haloalkyl aromatic sulfonyl halides can be prepared by reacting one molecular equivalent of a beta-haloalkyl aromatic compound with several moles of a halosulfonic acid and, in the research leading to the present invention, it was found that a beta-haloalkyl aromatic sulfonyl halide, e. g. a beta-bromoethylbenzene-sulfonyl chloride, can simultaneously be hydrolyzed and dehydrohalogenated with an aqueous alkali to form a salt of a vinyl aromatic sulfonic acid.

Such a method for making salts of vinyl aromatic sulfonic acids is disadvantageous in a number of respects. The beta-haloalkyl aromatic sulfonyl halides are prepared by reacting one molecular equivalent of a beta-haloalkyl aromatic compound, such as beta-bromoethylbenzene, with three or more molecular equivalents of a halosulfonic acid such as chlorosulfonic acid and pouring the reacted mixture on ice to cause separation of the desired product. The large excess of halosulfonic acid, required to obtain a good yield of the beta-haloalkyl aromatic sulfonyl halide, not only adds to the cost of production, but leads to formation of undesired by-products. It was found necessary that the beta-haloalkyl aromatic sulfonyl halide be purified, e. g. by distillation under vacuum, prior to further use in the process in order to obtain, as the final product, a vinyl aromatic sulfonate of good quality. Such distillation is inconvenient to carry out and is usually accompanied by a considerable loss of material through decomposition or formation of by-products. The simultaneous hydrolysis and dehydrohalogenation of the beta-haloalkyl aromatic sulfonyl halide by heating the same together with an aqueous alkali occurs readily, and results in formation of an aqueous solution of the vinyl aromatic sulfonate product with frequent loss of a portion of the product due to polymerization. The aqueous solution thus formed comprises a large proportion of dissolved inorganic salts such as sodium chloride and/or sodium bromide. Although the desired product, e. g. a sodium, potassium, or calcium salt of styrenesulfonic acid, can be separated and purified by fractional crystallization, such crystallization is difficult to carry out and usually results in a poor yield of the purified product. Because of these difficulties, the above-mentioned method, discovered in the research leading to the present invention, is not well adapted to commercial practice.

It has now been found that vinyl aromatic sulfonates can be prepared by reacting together approximately equimolecular amounts of sulfur trioxide and a beta-haloethyl aromatic compound and treating the product, presumably a beta-haloethyl aromatic sulfonic acid, with an alkali to dehydrohalogenate the same and form a salt of the vinyl aromatic sulfonic acid thus formed. This method is advantageous in a number of respects. It permits use of the stoichiometric amount of the sulfonating agent, i. e. sulfur trioxide, in the reaction and nearly complete consumption of the sulfur trioxide. It avoids the extensive formation of by-products which takes place when using a halosulfonic acid as the sulfonating agent. The beta-haloethyl aromatic sulfonic acids can readily be separated, by an extraction procedure hereinafter described, from the minor amounts of organic by-products, principally organic sulfones, which are sometimes formed together therewith. The beta-haloethyl aromatic sulfonic acids are readily dehydrohalogenated by treatment with an aqueous alkali to obtain corresponding salts of vinyl aromatic sulfonic acids in good yield and accompanied by a far lower proportion of inorganic salts than is present in the product obtained by use of a halosulfonic acid as the sulfonating agent. The alkali metal and alkaline earth metal salts of the vinyl aromatic sulfonic acids can be crystallized and recovered in good purity from the aqueous reaction mixtures thus formed. The process permits production of the purified product in higher yield than is obtainable when using a halosulfonic acid as the sulfonating agent. The dry crystalline metal salts of the vinyl aromatic sulfonic acids are sufficiently stable for storage or shipment at room temperature or thereabout. The salts can be homopolymerized or copolymerized with other vinylidene compounds by known polymerization procedures to obtain corresponding nuclear sulfonated polymeric products. If desired, such metal salts can be chemically treated to liberate the corresponding vinyl aromatic sulfonic acids which may also be homopolymerized or be copolymerized with other vinylidene compounds.

The beta-haloethyl aromatic compounds which may be employed as starting materials in the process of the invention have the general formula:

$$Ar-CH_2CH_2-X$$

wherein X represents chlorine or bromine. Examples of such compounds are beta-chloroethylbenzene, beta-bromoethylbenzene, ar-(beta-chloroethyl)toluene, ar-(beta-bromoethyl)toluene, ar-(beta-chloroethyl)xylene, ar-(beta-bromoethyl)xylene, ar-(beta-chloroethyl)mesitylene, ar-(beta-bromoethyl)mesitylene, beta-chloroethylnaphthalene, beta-bromoethylnaphthalene, beta-chloroethylchlorobenzene, beta-bromoethylchlorobenzene, and beta-bromoethylbromobenzene, etc. The beta-bromoethyl aromatic compounds are preferred.

The beta-haloethyl aromatic compound is sulfonated by treatment with 1.2 times its molecular equivalent or less of sulfur trioxide. The sulfur trioxide can be used in as small a proportion as desired, e. g. in amount as low as 0.1 the molecular equivalent of the beta-haloethyl aromatic reactant, the excess of the latter being recovered and recycled. Approximately one, e. g. from 0.8 to 1.2, molecular equivalent of sulfur trioxide is preferably employed per mole of the beta-haloethyl aromatic reactant. The reactants may be admixed in any order, e. g. by pouring the aromatic reactant into a liquid body comprising the sulfur trioxide or by causing separate streams comprising the respective reactants to flow together at rates such as to form a mixture containing approximately equimolecular proportions of the reactants. The sulfur trioxide is preferably fed into a liquid body comprising the beta-haloethyl aromatic reactant so as to maintain a molecular excess of the latter in early stages of the reaction. The reaction mixture is advantageously stirred, or otherwise agitated, during mixing of the reactants, regardless of the mode of bringing the reactants together.

The sulfur trioxide may be diluted or undiluted and may be in liquid or vaporized form when fed to the sulfonation reaction. It is preferably diluted with one-third of its volume or more of a liquid or gas resistant to immediate chemical attack by the same prior to employment in the reacton. Examples of suitable diluents are nitrogen, liquid or gaseous sulfur dioxide, and the liquid polychlorinated aliphatic hydrocarbons hereinafter mentioned.

The beta-haloethyl aromatic compound should be in liquid or liquefied, e. g. dissolved, form when subjected to the sulfonation. It may be sulfonated directly in the absence of a solvent or diluent, but is preferably diluted to form a solution of not more than 70, e. g. of from 1 to 70 and usually of from 5 to 30 percent by weight concentration prior to being sulfonated.

A variety of liquids which are inert to, or only sluggishly reactive with, sulfur trioxide and which are suitable for use as media for the sulfonation of aromatic compounds are known in the art. Examples of such solvents are liquid sulfur dioxide and liquid polychlorinated aliphatic hydrocarbons such as carbon tetrachloride, tetrachloroethylene, ethylene chloride, chloroform and methylene chloride, etc. Any such liquid, or liquids, capable of dissolving the beta-haloethyl aromatic reactants, can be employed. Methylene chloride is preferred.

The optimum reaction conditions are dependent upon variable factors such as the kind and amount of diluent present in the reaction mixture, the mode of admixing the reactants, and the reaction temperature, certain of which variable factors are interdependent. Sulfur trioxide is capable of reacting not only to sulfonate the beta-haloethyl aromatic compound in the desired manner, but also to form sulfone by-products such as bis-(beta-bromoethylphenyl) sulfone. It is also capable of reacting to an appreciable extent with liquid polychlorinated aliphatic hydrocarbons, such as are usually employed as media for the reaction, to form other undesired by-products. The reactions to form by-products occur more extensively as the reaction temperature is raised, especially above 50° C. The side reaction to form an organic sulfone also occurs more extensively with increase in the concentration of the reactants in the reaction mixture and may be suppressed by carrying the reaction out in the presence of one or more of the aforementioned liquid diluents.

For these reasons, the sulfonation is usually carried out at temperatures between —10° and 50° C. by feeding diluted sulfur trioxide, in liquid or vaporized form, into a solution of the beta-haloethyl aromatic compound in one or more of the aforementioned liquid solvents while stirring, or otherwise agitating, the resulting mixture. However, by suitable balance between the above-discussed variable reaction conditions, the sulfonation can be carried out at lower or higher temperatures, e. g. at temperatures of from —20° C. to 80° C. The sulfonation is usually accomplished at atmospheric pressure or thereabout, but it can be carried out in a closed reaction system at pressures as high as desired, e. g. up to 100 pounds per square inch, gauge, or above. When carried out at room temperature or above, the reaction can usually be completed in less than one hour and sometimes in only a few minutes, e. g. 15 minutes or less. In some instances, a portion of the sulfonated product precipitates from the reaction mixture. The precipitate may, if desired, be separated by filtration. Usually, the entire product is treated as described below to separate and purify the beta-haloethyl aromatic sulfonic acid product.

It has been found that the beta-haloethyl aromatic sulfonic acid products are readily soluble in water, whereas the organic sulfones which are usually formed in small amount together therewith are less soluble in water than in water-immiscible organic liquids such as benzene, toluene, chlorobenzene, or the polychlorinated aliphatic hydrocarbons usually employed as media for the sulfonation reaction. Accordingly, the sulfonated material, or a crude sulfonation mixture comprising the same at least partially dissolved in a liquid polychlorinated aliphatic hydrocarbon, is washed with water to extract the beta-haloethyl aromatic sulfonic acid therefrom and the aqueous extract is separated from remaining material. The water is usually employed in amount such as to form an extract containing 20 percent by weight or more of the beta-haloethyl aromatic sulfonic acid, but it can be used in larger proportions if desired. The aqueous extract is preferably washed with one of the aforementioned water-immiscible solvents, e. g. methylene chloride, so as to assure substantially complete removal of any organic sulfone by-products, but this step is not required.

The aqueous extract is treated with a sufficient amount of an alkali, preferably a basic alkali metal or alkaline earth metal compound, to form a salt of the beta-haloalkyl aromatic sulfonic acid and to neutralize the acid formed by complete dehydrohalogenation of the same. For instance, at least two molecular equivalents of a base such as an alkali metal hydroxide, or one mole of lime, are employed per mole of acid, predominantly the beta-haloalkyl aromatic sulfonic acid, present in the aqueous extract. The alkali is preferably employed in from 10 to 40 percent excess over the stoichiometric proportion just stated. Any strongly basic alkali can be used. Examples of basic compounds which may be employed are sodium hydroxide, potassium hydroxide, lime, barium hydroxide, sodium carbonate, and potassium carbonate, etc. Sodium hydroxide is usually employed. It is usually added as an aqueous solution thereof, to the aqueous extract containing the beta-haloethyl aromatic sulfonic acid. However, the mode of combining these reactants is not critical to the success of the process.

The added alkali reacts with the beta-haloethyl aromatic sulfonic acid at ordinary temperatures, i. e. room temperature or lower. However, the aqueous extract containing the beta-haloethyl aromatic sulfonic acid is preferably warmed, e. g. to from 50° to 100° C., prior to, during, or after addition of the alkali so as to obtain a rapid and substantially complete reaction. The extent of the reaction can be determined by titrating an aliquot portion of the mixture with a standard acid solution to determine the amount of alkali consumed. The reaction is usually continued until at least 75 percent of the above-stated stoichiometric amount of alkali is consumed, but is discontinued before, or within a short time, e. g. an hour or less and preferably as soon as possible, after, the stoichiometric amount of alkali has been consumed, since prolonged heating may result in polymerization of part, or all, of the vinyl aromatic sulfonate product. The reaction may be terminated, or rendered sluggish, by cooling the mixture, e. g. to below 50° C. and preferably to room temperature or lower, or by neutralizing any unconsumed alkali in the mixture, and is preferably accomplished by both cooling and neutralizing the mixture. Any acid, e. g. hydrochloric, hydrobromic, sulfuric, or acetic acid, can be used for the neutralization which may be accomplished before or after cooling the mixture.

By limiting the amount of water employed in the above-described extraction and alkali-treating steps so that the mixture contains 20 percent by weight or more of the vinyl aromatic sulfonate product, a large proportion of the latter usually precipitates, especially upon cooling the mixture, and can be removed by filtration. The remaining liquor can be concentrated by evaporation under vacuum to precipitate a further amount of the product.

The solid salts of vinyl aromatic sulfonic acids, thus obtained, are sufficiently stable, when dry, for storage or shipment. When desired, they can be homopolymerized or copolymerized with other vinylidene compounds by known procedures to obtain polymeric products containing nuclear sulfonated aromatic radicals.

The following examples describe ways in which the invention has been practiced, but are not to be construed as limiting its scope.

*Example 1*

To a solution of 1 molecular equivalent of beta-bromoethylbenzene in 9 times its weight of methylene chloride, which solution is at room temperature, a solution of 1.1 molecular equivalent of sulfur trioxide in 9 times its weight of methylene chloride is added dropwise in 25 minutes while stirring the resulting mixture. A sulfonation reaction occurs during the addition. The reacted mixture is extracted with sufficient water to form an aqueous extract containing approximately 34 percent by weight of the beta-bromoethylbenzene sulfonic acid product. The extract is separated from the remainder of the mixture and is, itself, washed with an equal volume of methylene chloride. The aqueous extract is then added slowly and with stirring to an aqueous 50 weight percent sodium hydroxide solution containing 2.1 molecular equivalents of sodium hydroxide. The resulting mixture is warmed to 70–80° C. for 30 minutes and then cooled to room temperature, whereupon sodium para-styrene sulfonate, formed during heating of the alkaline mixture, precipitates. The solid sodium styrene sulfonate product is removed by filtration.

*Example 2*

A vapor mixture of 400 grams (5 moles) of sulfur trioxide and about an equal volume of nitrogen was fed in 80 minutes into a solution of 925 grams (5 moles) of beta-bromoethylbenzene while stirring the resulting mixture. The solution of beta-bromoethylbenzene was initially at 0° C. During the addition, the mixture warmed spontaneously to 38° C. Upon completion of the addition the reaction mixture solidified due, it is believed, to loss of part of the methylene chloride by vaporization. The product was washed from the reaction vessel with methylene chloride in amount such as to dissolve most of the product. Approximately 65.4 grams of the product which had not been dissolved was separated by filtration and was found to be completely soluble in water. Methylene chloride was evaporated to obtain the remainder of the product as a tan solid. It was dried, weighed, and tested for solubility in water and the water-insoluble portion thereof was separated by filtration, dried, and weighed. There were obtained a total of 1230.8 grams of the water-soluble product, beta-bromoethylbenzene sulfonic acid, and 69.2 grams of insoluble by-product, i. e. 4,4'-bis-(beta-bromoethyl)diphenylsulfone. The combined yield of both products was approximately 99 percent of theoretical. The yield of beta-bromoethylbenzene sulfonic acid was about 93 percent of theoretical.

*Example 3*

To a solution of 21.9 grams (0.1 mole) of 1-(beta-bromoethyl)2-chlorobenzene in 300 grams of methylene chloride, 8.1 grams (0.1 mole) of liquid sulfur trioxide was added dropwise and with stirring in 10 minutes. The mixture warmed spontaneously to about 35° C. during the addition. The mixture was permitted to stand for 15 minutes, at the end of which time 75 ml. of water was added slowly and with stirring. The resulting mixture was permitted to settle into layers, and the two layers were separated. The aqueous layer was scrubbed with 25 ml. of methylene chloride and the latter was separated therefrom. To the aqueous layer, a solution of 16.8 grams (0.3 mole) of potassium hydroxide in 25 ml. of water was added slowly and with stirring. A clear, amber solution resulted. The solution was heated at 70° C. for 30 minutes. It was then neutralized to a pH value of 7 by treatment with an aqueous solution of equimolecular amounts of hydrochloric and hydrobromic acids. The solution was cooled to room temperature, whereby the product was crystallized therefrom, and filtered. The residual product was dried under vacuum. The dried product weighed 9.35 grams. It was analyzed and found to be potassium ar-chlorostyrene sulfonate of 77 weight percent purity, or higher. Impurities identified as being present were potassium bromide and potassium chloride. The mother liquor from the crystallization was found, by analysis, to have retained 2.1 grams of potassium ar-chlorostyrene sulfonate in solution. The yield of monomeric potassium ar-chlorostyrene sulfonate

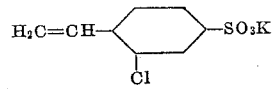

is estimated to have been 36 percent of theoretical.

*Example 4*

To a solution of 19.9 grams (0.1 mole) of beta-bromoethyltoluene, $BrCH_2CH_2C_6H_4CH_3$, in 200 grams of methylene chloride, 8.1 grams (0.1 mole) of liquid sulfur trioxide was added dropwise with stirring in 10 minutes. The mixture was permitted to stand for 10 minutes. It was then extracted with 75 ml. of water. The aqueous extract was separated and was scrubbed with 25 ml. of methylene chloride. The thus-treated aqueous extract was a light yellow solution of beta-bromoethyltoluene sulfonic acid, having the formula:

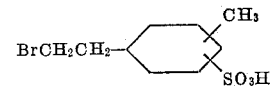

To the aqueous solution, a solution of 12 grams (0.3 mole) of sodium hydroxide in 25 ml. of water was added slowly with stirring. The resulting solution was heated at 70° C. for 45 minutes. An aliquot portion of the solution was withdrawn and analyzed. The analysis indicated that the reaction mixture contained 13.8 grams, or 63 percent of the theoretical yield, of sodium ar-methylstyrene sulfonate. The remainder of the solution was cooled to crystallize the product and the latter was separated by filtration. It was a white, paste-like solid material. The sodium ar-methylstyrene sulfonate has the formula:

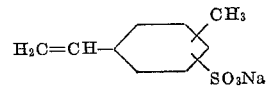

I claim:

1. A beta-haloethyl-aromatic sulfonic acid of the benzene series wherein the halogen atom of the beta-haloethyl radical is of the group consisting of chlorine and bromine.

2. A beta-bromoethyl-aromatic sulfonic acid of the benzene series.

3. Beta-bromoethyl-benzene sulfonic acid.

4. 1-beta-bromoethyl-2-chlorobenzene sulfonic acid.

5. A beta-bromoethyl-toluene sulfonic acid having the general formula:

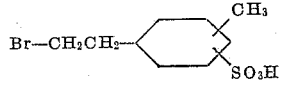

6. A method of making a salt of a vinyl aromatic sulfonic acid which comprises sulfonating a beta-haloethyl aromatic compound by mixing approximately its molecular equivalent of sulfur trioxide therewith at a reaction temperature below 80° C., extracting the resulting beta-haloethyl aromatic sulfonic acid from the reaction products with water, treating the aqueous extract with an alkali in amount at least as great as that theoretically required to neutralize the same and the hydrogen halide which would result from dehydrohalogenation of the beta-haloethyl aromatic sulfonic acid by splitting of a hydrogen halide from the beta-haloethyl radical thereof, and reacting the alkali with the beta-haloethyl aromatic sulfonic acid at temperatures between 50° and 100° C. until at least 75 percent of the above-stated theoretical amount of alkali is consumed and for a time not greatly in excess of that at which said theoretical amount of alkali is consumed.

7. A method of making a salt of a vinyl aromatic sulfonic acid which comprises feeding approximately one molecular equivalent of sulfur trioxide into admixture with a solution of one molecular equivalent of a beta-haloethyl aromatic compound in a liquid inert thereto and resistant to chemical attack by sulfur trioxide, which solution contains not more than 70 percent by weight of the beta-haloethyl aromatic compound, while agitating and maintaining the resulting mixture at reaction temperatures between −20° C. and 50° C., extracting the resulting beta-haloethyl aromatic sulfonic acid from the reaction products with water, treating the aqueous extract with a strong alkali in amount exceeding that theoretically required to neutralize the beta-haloethyl aromatic sulfonic acid and the hydrogen halide that would result from complete dehydrohalogenation of the beta-haloethyl aromatic sulfonic acid by splitting of a hydrogen halide from the beta-haloethyl radical thereof, and heating the mixture at reaction temperatures between 50° and 100° C. until at least 75 percent of the above-stated theoretical amount of alkali has been consumed and for a time not greatly exceeding that at which said theoretical amount of alkali is consumed.

8. A method of making a salt of a vinyl aromatic sulfonic acid which comprises feeding, to a solution of one molecular equivalent of a beta-haloethyl aromatic compound in an inert solvent therefor, that is resistant to chemical attack by sulfur trioxide, which solution contains not more than 70 percent by weight of the beta-haloethyl aromatic compound, a substantially homogeneous mixture of about one molecular equivalent of sulfur trioxide and at least one-third its volume of a fluid resistant to chemical attack by sulfur trioxide, while stirring the resulting mixture and maintaining it at reaction temperatures between −10° and 50° C., extracting the beta-haloethyl aromatic sulfonic acid thus-formed from the reaction products with water, treating the aqueous extract with a strong alkali in amount exceeding that theoretically required to neutralize the beta-haloethyl aromatic sulfonic acid and the hydrogen halide that would result from dehydrohalogenation of the same by splitting of a hydrogen halide from the beta-haloethyl radical thereof, heating the mixture at reaction temperatures between 50° and 100° C. until at least 75 percent of the above-stated theoretical amount of alkali has been consumed and for a time not greatly exceeding that at which said theoretical amount of alkali is consumed, neutralizing unconsumed alkali remaining in the mixture, crystallizing from the mixture the salt of a vinyl aromatic sulfonic acid thus-formed, and separating the crystalline product.

9. A method, as claimed in claim 8, wherein the beta-haloethyl aromatic starting compound is beta-bromoethylbenzene.

10. A method, as claimed in claim 8, wherein the alkali is an alkali metal hydroxide.

11. A method, as claimed in claim 8, wherein the alkali is lime.

12. A method which comprises sulfonating a beta-haloethyl aromatic compound by reacting approximately its molecular equivalent of sulfur trioxide therewith at temperatures between −20° and 80° C.

13. A method which comprises passing a substantially uniform mixture of approximately one molecular equivalent of sulfur trioxide and at least one-third its volume of a fluid which is resistant to chemical attack by sulfur trioxide into a liquid solution containing one molecular equivalent of a beta-haloethyl aromatic compound in an inert solvent therefor that is resistant to chemical attack by sulfur trioxide, which solution contains not more than 70 percent by weight of the beta-haloethyl aromatic compound, while stirring and maintaining the resulting mixture at a reaction temperature between −20° and 80° C., and extracting the beta-haloethyl aromatic sulfonic acid thus-formed from the reaction products with water.

14. A method which comprises heating a beta-haloethyl aromatic sulfonic acid together with an aqueous alkali, in amount exceeding that theoretically required to neutralize the beta-haloethyl aromatic sulfonic acid and the hydrogen halide that would result from dehydrohalogenation of the same by splitting of hydrogen halide from the beta-haloethyl radical thereof, at reaction temperatures between 50° and 100° C. until at least 75 percent of said theoretical amount of alkali is consumed and for a time not greatly exceeding that at which said theoretical amount of alkali is consumed, neutralizing unconsumed alkali remaining in the mixture, and crystallizing the resulting salt of a vinyl aromatic sulfonic acid from the mixture.

15. In a method for making a salt of a vinyl aromatic sulfonic acid wherein an initially unsulfonated beta-haloethyl aromatic compound is sulfonated, the steps of accomplishing the sulfonation by reacting together approximately equimolecular amounts of sulfur trioxide and the beta-haloethyl aromatic compound at reaction temperatures below 80° C., treating the resulting beta-haloethyl aromatic sulfonic acid with an aqueous alkali in amount at least as great as that theoretically required to neutralize the same and the hydrogen halide which would result from dehydrohalogenation of the beta-haloethyl aromatic sulfonic acid by splitting of a hydrogen halide from the beta-haloethyl radical thereof, and reacting the alkali with the beta-haloethyl aromatic sulfonic acid at temperatures between room temperature and 100° C. for a time not greatly in excess of that at which the above-stated theoretical amount of alkali is unconsumed.

References Cited in the file of this patent

UNITED STATES PATENTS

| 1,422,564 | Grob et al. | July 11, 1922 |
| 1,999,955 | Carr et al. | Apr. 30, 1935 |
| 2,283,236 | Soday | May 19, 1942 |
| 2,322,258 | Strosacker et al. | June 22, 1943 |
| 2,404,538 | Schmerling et al. | July 23, 1946 |
| 2,564,506 | Schaeffer | Aug. 14, 1951 |
| 2,573,675 | Bloch et al. | Nov. 6, 1951 |
| 2,678,947 | Jones | May 18, 1954 |